(No Model.)
J. F. KELLY & C. C. CHESNEY.
APPARATUS FOR NEUTRALIZING THE EFFECTS OF SELF INDUCTION IN ALTERNATING CURRENT CIRCUITS.
No. 518,738.          Patented Apr. 24, 1894.
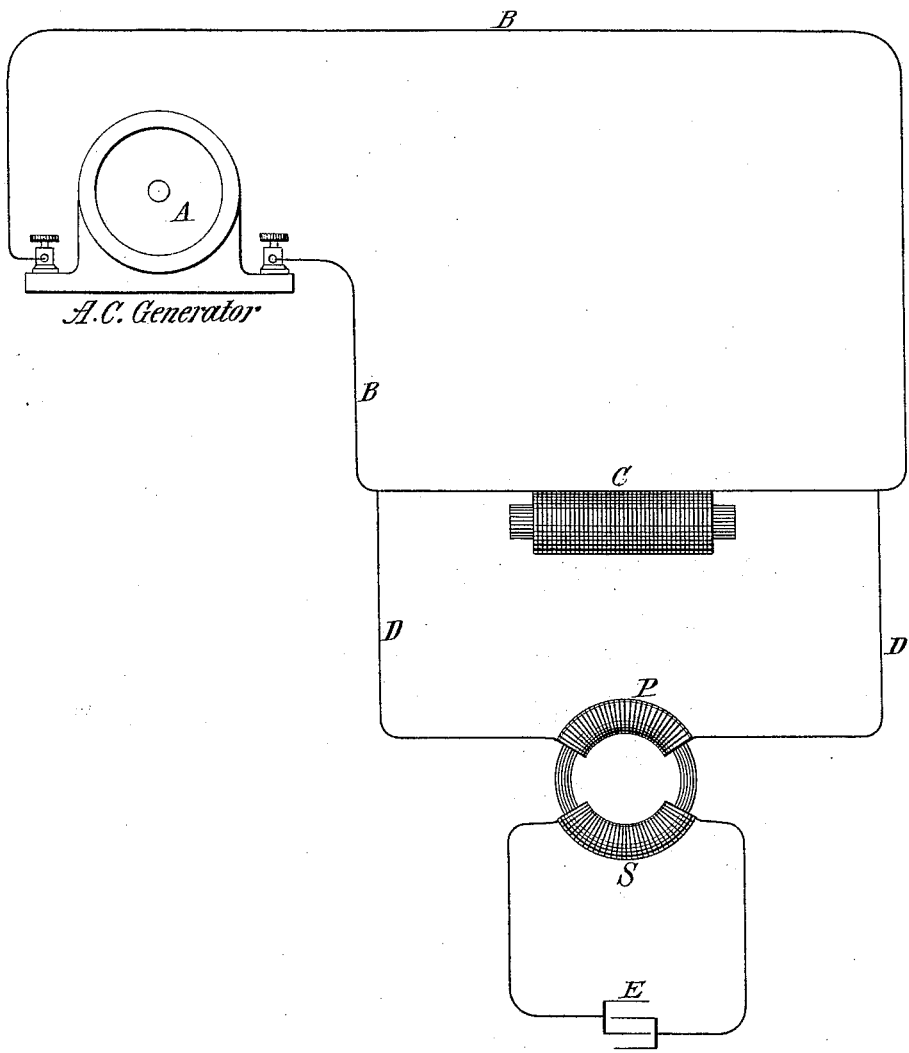
Witnesses:
Raphaël Netter
James W. Catlow
Inventors
John F. Kelly
and Cummings C. Chesney
by Duncan & Page,
Attorneys
THE NATIONAL LITHOGRAPHING COMPANY,
WASHINGTON, D. C.

UNITED STATES PATENT OFFICE.

JOHN F. KELLY AND CUMMINGS C. CHESNEY, OF PITTSFIELD, MASSACHUSETTS, ASSIGNORS TO THE STANLEY LABORATORY COMPANY, OF SAME PLACE.

APPARATUS FOR NEUTRALIZING THE EFFECTS OF SELF-INDUCTION IN ALTERNATING-CURRENT CIRCUITS.

SPECIFICATION forming part of Letters Patent No. 518,738, dated April 24, 1894.

Application filed November 18, 1893. Serial No. 491,312. (No model.)

*To all whom it may concern:*

Be it known that we, JOHN F. KELLY and CUMMINGS C. CHESNEY, citizens of the United States, residing at Pittsfield, in the county of Berkshire and State of Massachusetts, have invented certain new and useful Improvements in Apparatus for Neutralizing the Effects of Self-Induction in Alternating-Current Circuits, of which the following is a specification, reference being had to the drawing accompanying and forming a part of the same.

The drawing hereto annexed represents in diagram an alternating current system to which our invention is applied. Assume any circuit in which, by reason of self induction the current is caused to lag behind the impressed electro-motive force. For sake of illustration we may assume that the circuit in question is a portion of a circuit B B from a generator A of alternating currents and that it contains an electro-magnet C, such as the field magnets of an alternating current motor. In parallel or derivation to this circuit is a circuit D including the primary P of a transformer. The secondary S of this transformer includes in its circuit a condenser E. When the several elements described are so proportioned that the current in the primary circuit of the transformer is given a negative lag of nearly ninety degrees, and the transformer is of such dimensions that this current is about equal to the lagging component of the main or working circuit, they constitute the combination which forms the subject of our present application. It is now well known that if a condenser be placed in parallel to an electro-magnet supplied by alternating currents and made of proper capacity, it will neutralize the effects of self induction in the magnet circuit for a given frequency and reduce the current supplied by the generator to the energy limit, such current otherwise, being generally in excess of that corresponding to the actual energy supplied. This plan is shown and described in United States patent to Stanley, Jr., and Kelly, No. 483,816, dated October 4, 1892. But one of the main difficulties experienced in the use of condensers for this purpose is that the cost of the condenser required for systems of low electro-motive force becomes so great that for very low electro-motive forces the ordinary condenser becomes impracticable. It has been found, however, that if a condenser of proper capacity be inserted in the secondary of a transformer, the combined transformer and condenser acquire the properties of a condenser with respect to their effect upon the primary circuit. In illustration of this and considering the transformer and condenser above described, if we let A equal the apparent coefficient of self induction of the primary circuit; T equal the true coefficient of self induction of the primary circuit; S equal the coefficient of self induction of the secondary circuit; M equal the coefficient of mutual induction; R equal the resistance of the secondary circuit; C equal the capacity of the secondary circuit; $m$ equal (2 multiplied by 3.1416 multiplied by the number of complete revolutions per unit time) the angular velocity of the current, it is well known that—

$$A = T - \left(S - \frac{1}{m^2 C}\right) \frac{M^2 m^2}{R^2 + \left(mS - \frac{1}{mC}\right)^2}$$

In a properly constructed transformer the coefficient of mutual induction is equal to the square root of the product of the coefficients of the self induction of the primary and secondary circuits ($M = \sqrt{TS}$), while the resistance of the secondary is very small as compared with the product of the angular velocity and the self induction of the secondary ($mS$), hence it is always possible to give such a value to C, the capacity of the condenser in the secondaries that $$T < \left(S - \frac{1}{m^2 C}\right) \frac{M^2 m^2}{R^2 + \left(mS - \frac{1}{mC}\right)^2}$$

in which case A the apparent coefficient of self induction of the primary will have a negative value. But a negative value for self induction is the equivalent to a capacity effect in the circuit. In accordance with this law we make the condenser in the secondary circuit of such capacity that it will leave the lag of the current in such circuit behind its electromotive force very great, at the same time increasing the current so that its magnetizing power is greater than that of the primary. Under such conditions the counter electromotive force developed in the primary circuit by the transformer is very nearly in opposition to that which the primary coil alone develops, and, in consequence the primary current acquires a negative lag. Such a combination therefore acts in a similar manner to a condenser and as we may establish any ratio between the electro-motive forces in the primary and secondary circuits, we are enabled, while maintaining a low electro-motive force in the main circuit to apply a high electro-motive force to the condenser and so to build the same cheaply. The current flowing in the primary is given by the equation $$Cu = \sqrt{\frac{E^2}{Ra^2 + m^2 A^2}}$$

in which $Cu$ is the current, $Ra$ the apparent resistance of the primary and $E$ the impressed electro-motive force, the other factors $m$ and $A$ being the same as above. The value of $Ra$ is in turn given by the equation $$Ra = Rp + R \frac{m^2 M^2}{R^2 + \left(mS - \frac{1}{mC}\right)^2}$$

$Rp$ being the true resistance of the primary and the other expressions the same as before.

What we claim as our invention is—

The combination with an alternating current working circuit possessing self induction, of a transformer having its primary in derivation to said circuit, and a condenser in the circuit of its secondary, the transformer and condenser being proportioned as herein described so as to produce in the current in the primary of the transformer a negative lag for neutralizing the effects of the self induction in the working circuit, as herein set forth.

JOHN F. KELLY.
CUMMINGS C. CHESNEY.

Witnesses:
ERNEST B. CASTLE,
R. W. POWER.